A. & W. J. DUVALL.
HULLING RICE AND RUBBING WHEAT.
No. 567. Patented Jan. 9, 1838.
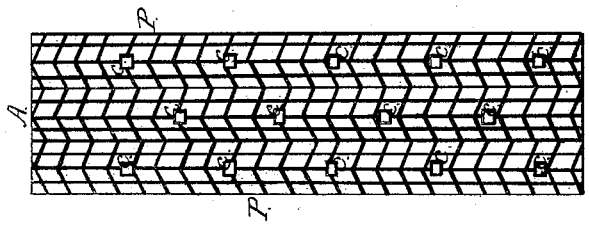
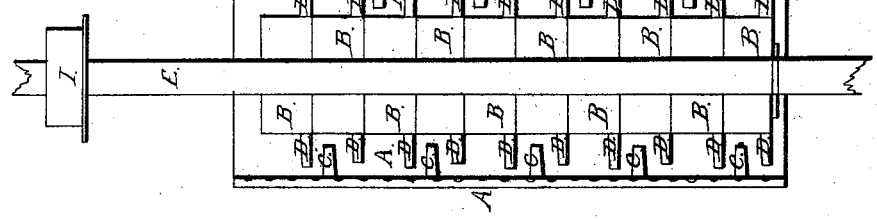
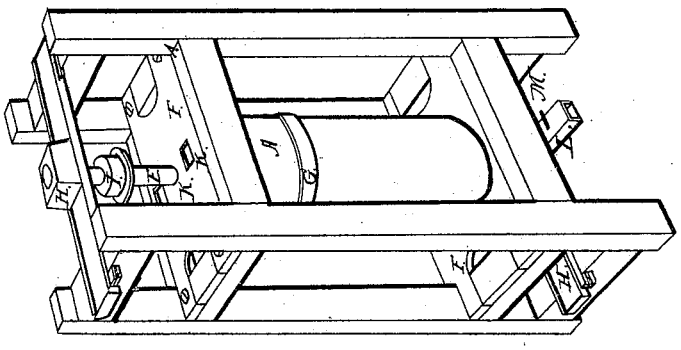

UNITED STATES PATENT OFFICE.

ALFRED DUVALL AND WM. I. DUVALL, OF BALTIMORE, MARYLAND.

MACHINE FOR RUBBING WHEAT AND HULLING RICE AND OTHER GRAIN.

Specification of Letters Patent No. 567, dated January 9, 1838; Antedated August 11, 1837.

*To all whom it may concern:*

Be it known that we, ALFRED DUVALL and WILLIAM I. DUVALL, both of the city of Baltimore and State of Maryland, have invented a new and useful Machine for Rubbing Wheat, Hulling Rice, &c.; and we do hereby declare that the following is a full and exact description of the same, reference being had to the annexed drawings, making part of this specification.

The machine is constructed as follows:—

1, 1, Figure 1, represents an upright frame in which is placed the cylinder A, which is about three and a half feet long and thirteen inches in diameter, standing upright and stationary. Within said cylinder is a corresponding runner B, Fig. 2, of cylindrical form of the same height of the cylinder. The cylinder A, has teeth C, formed and disposed as follows: They are about three inches long, three eighths to five eighths of an inch square at the small end, and from three quarters to an inch square at the large end where they unite with the staves of the cylinder, and are directed inward and standing at right angles with the staves of said cylinder. Said teeth are formed in spiral ranges from the top to the bottom of the cylinder. The runner B, Fig. 2, has similar teeth D, formed in sections Fig. 4 and placed on a vertical shaft E, Fig. 2, in spiral ranges; said teeth work between the teeth in the cylinder A, the teeth work between each other at equal distances apart leaving a space between the teeth every way of from one eighth to five eighths of an inch to suit the particular purpose to which it may be applied. The cylinder A, is constructed in sections of circles or staves of cast iron P, Fig. 3. The staves are preferably cast from two separate patterns, the one having an even number of teeth and the other an odd, so that when they are formed into a cylinder the teeth in the adjoining staves do not stand opposite each other, there being an equal number of each kind of staves to a cylinder—say from six to eight of each, the staves are then placed between the two plates of cast iron F, F, Fig. 1 which are bolted to the frame 1, 1. The plates are cast each with a circular groove, of the diameter to suit the size of the cylinder. The staves are then placed in said grooves by which they are formed into a cylinder. They are bound together by a band or hoop G.

The revolving runner B, is constructed of a number of cast iron circles B Fig. 4, to suit the number of teeth in the staves of the stationary cylinder; these circles are cast with an odd number of teeth on them, projecting outward from the center; the teeth are similar to those formed on the staves of the stationary cylinder; the circles or sections are then placed on the vertical shaft E, Figs. 1 and 2 so as to form the teeth in spiral range from bottom to top of the runner B. The runner B, is then supported by means of two cast iron bridges H, H, Fig. 1 attached to the frame 1, 1, which are adjusted by keys. Motion is given to the runner B, by means of a band applied to a cast iron pulley I, and may have from one to five hundred revolutions per minute to suit the material that may be hulled or rubbed. The grain is admitted through either of the apertures K, K, in the upper plate F, the other aperture K serving as a ventilator for dust, &c. The grain passes between the teeth of cylinder A, and B, is discharged through the aperture in the lower plate F, into a spout L, in which there is a gate M, by means of which the rubbing of the grain is regulated. The grain in this machine, we believe, undergoes a different operation from that of any heretofore used, being moved around in the machine with great velocity in its descent being prevented from passing too fast through the machine by the irregular number of teeth in the revolving cylinder or runner and the spiral from in which they are placed in the cylinders A, and B. The grain is also impeded in its course between the teeth in the cylinder A, against which it is driven by the teeth on the cylinder B, receiving the friction of the grain as it is deranged in its course through the machine; by this means the impurities are separated from the grain the friction being so great on wheat as to separate the thin coat of silic or gum that surrounds it; removing also the fuzz or barbs which adhere to the end of the grains leaving the wheat or other material completely cleaned.

The invention claimed by us, the said ALFRED DUVALL and WILLIAM I. DUVALL, and which we desire to secure by Letters Patent, consists in—

1. The mode of constructing the cylinder and runners with teeth passing between each other in the manner before described.

2. The mode of constructing the case of the cylinder and the core of the runner is not claimed.

ALFRED DUVALL.
WILLIAM I. DUVALL.

Witnesses:
THOS. W. BOND,
JOHN W. POST.